United States Patent
Hendrich et al.

(10) Patent No.: US 7,513,340 B2
(45) Date of Patent: Apr. 7, 2009

(54) BRAKE HOLDER FOR A FLOATING-CALIPER DISK BRAKE WITH A BRAKE PAD GUIDE SPRING

(75) Inventors: Uwe Hendrich, Steinbach (DE); Reiner Müller, Hattersheim (DE); Rolf Weiler, Eppstein (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 172 days.

(21) Appl. No.: 10/521,530

(22) PCT Filed: Jun. 7, 2003

(86) PCT No.: PCT/EP03/06011

§ 371 (c)(1),
(2), (4) Date: Jan. 14, 2005

(87) PCT Pub. No.: WO2004/015294

PCT Pub. Date: Feb. 19, 2004

(65) Prior Publication Data

US 2006/0070828 A1  Apr. 6, 2006

(30) Foreign Application Priority Data

Jul. 24, 2002 (DE) .............................. 102 33 446

(51) Int. Cl.
 *F16D 65/40* (2006.01)
 *F16D 65/14* (2006.01)
(52) U.S. Cl. ............... 188/73.38; 188/73.36; 188/73.37
(58) Field of Classification Search .............. 188/73.31, 188/73.36, 73.37, 73.38, 246, 250 G, 73.32
See application file for complete search history.

(56) References Cited

U.S. PATENT DOCUMENTS

| 4,181,200 | A |   | 1/1980 | Souma |
| 4,196,794 | A | * | 4/1980 | Matsumoto ............... 188/73.37 |
| 4,273,129 | A | * | 6/1981 | Boebel ........................ 128/831 |
| 4,429,769 | A | * | 2/1984 | Oshima et al. ........... 188/73.31 |

(Continued)

FOREIGN PATENT DOCUMENTS

DE  29 12 021 A1  10/1979

(Continued)

*Primary Examiner*—Melody M Burch
(74) *Attorney, Agent, or Firm*—RatnerPrestia

(57) ABSTRACT

The present invention relates to a brake holder of a floating-caliper disc brake for motor vehicles at which brake pads arranged on either side of an associated brake disc are displaceably mounted. To ensure ease of displaceability a brake pad guide spring is provided that extends between the brake holder and the brake pads. For ease of mountability of both the brake pads and the brake pad guide spring, it is arranged for that the brake pad guide spring is mountable on the brake holder in a generally radial direction and is locked at the brake holder in both radial and axial directions by means of at least one fixing clamp, and at least one spring arm is designed at the brake pad guide spring and fixes at least one brake pad under spring bias in position on the brake holder in a clearance-free manner. These provisions not only improve the mountability of a brake of this type but also the rattle-free resilient arrangement of the brake pads.

13 Claims, 4 Drawing Sheets

U.S. PATENT DOCUMENTS

| | | | |
|---|---|---|---|
| 4,607,728 A * | 8/1986 | Kobayashi | 188/73.38 |
| 5,125,482 A * | 6/1992 | Negishi | 188/73.38 |
| 5,699,882 A * | 12/1997 | Ikegami et al. | 188/73.38 |
| 6,378,666 B1 * | 4/2002 | Yoko | 188/73.38 |
| 6,478,122 B1 * | 11/2002 | Demoise et al. | 188/73.38 |
| 6,527,090 B1 * | 3/2003 | Barillot et al. | 188/73.38 |

FOREIGN PATENT DOCUMENTS

| | | |
|---|---|---|
| DE | 196 10 611 A1 | 9/1997 |
| DE | 100 50 013 A1 | 4/2002 |
| GB | 2 172 068 A | 9/1986 |
| JP | 57204335 A * | 12/1982 |
| JP | 5857528 A * | 4/1983 |
| WO | WO 01/31223 A1 | 5/2001 |
| WO | WO-0131223 A1 * | 5/2001 |

* cited by examiner

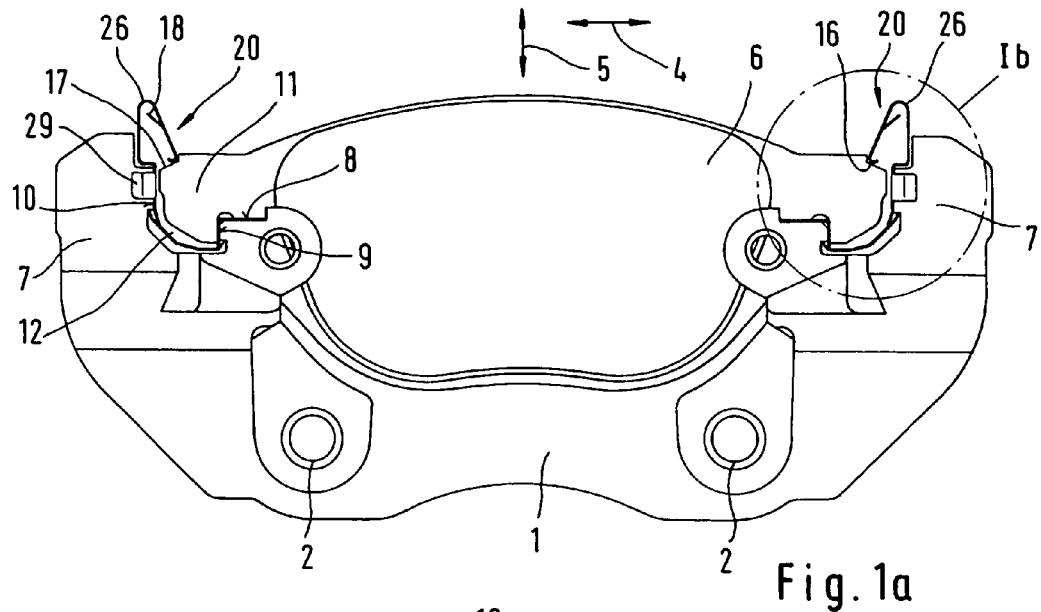
Fig. 1a
Fig. 1b
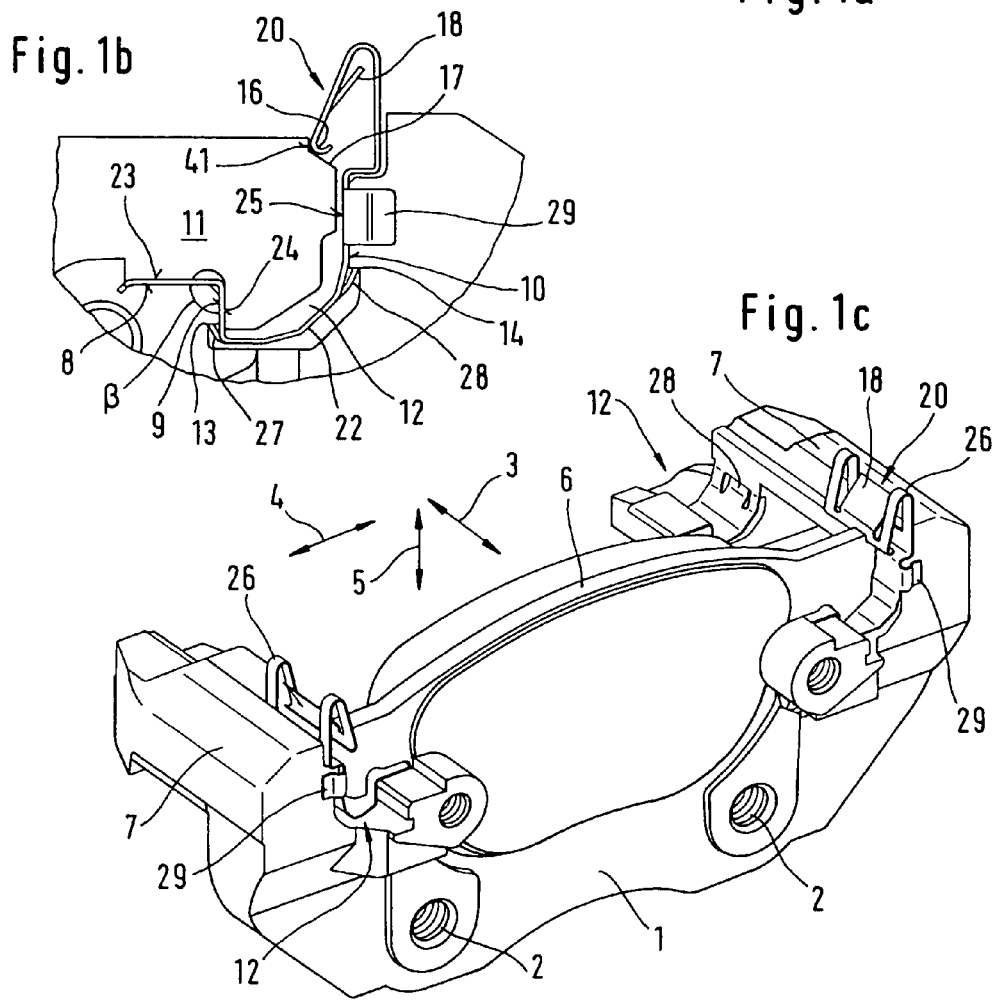
Fig. 1c

BRAKE HOLDER FOR A FLOATING-CALIPER DISK BRAKE WITH A BRAKE PAD GUIDE SPRING

TECHNICAL FIELD

The present invention relates to a brake holder of a floating-caliper disc brake for motor vehicles at which brake pads arranged on either side of an associated brake disc are displaceably mounted. To ensure ease of displaceability a brake pad guide spring is provided that extends between the brake holder and the brake pads.

BACKGROUND OF THE INVENTION

DE 100 50 013 A1 discloses a disc brake of this type comprising a brake holder fixed to the vehicle. In this application, the brake pads are guided in the brake holder in an axially displaceable manner, and a slide spring element is placed between the brake holder and the brake pads for greater ease of displaceability, through which element at least one brake pad is locked radially at the brake holder. The sliding spring element is attached to the brake holder so as to be held captive in a radial direction. The geometrical shape of the slide spring element is adapted to a guide profile in the brake holder that is also used for the displaceable accommodation of the brake pads. The result is a form-fit attachment of the slide spring element on the brake holder. Such a form-fit connection of slide spring element and brake holder implies, however, a poor or complicated mountability of the slide spring element on the brake holder. In addition, the simultaneous resilient arrangement of the brake pad by means of the slide spring element is insufficient so that a principally rattle-free guiding of the brake pads cannot be safeguarded.

Based on the above, an object of the invention is to devise a generic brake holder with a corresponding brake pad guide spring, the brake holder facilitating the assembly of the individual components and additionally enabling a comfortable resilient arrangement of an associated brake pad in the brake holder by means of the brake pad guide spring.

BRIEF SUMMARY OF THE INVENTION

This object is achieved by a brake holder of a floating-caliper disc brake for motor vehicles comprising a corresponding brake pad guide spring. The brake holder comprises axially extending holder arms at which associated brake pads are displaceably arranged, said brake pads being arranged on either side of a brake disc and mountable in the brake holder in a radial direction. For ease of displaceability of the brake pads in the brake holder, at least one brake pad guide spring is provided, which is arranged between the brake holder and the brake pads. In a novel manner, the brake pad guide spring is mountable on the brake holder in a generally radial direction and locked at the brake holder in both radial and axial directions by means of at least one fixing clamp. To this end, the brake pad guide spring is simply shifted into a corresponding portion of the brake holder which is simultaneously provided for the displaceable brake pad guide, with at least one fixing clamp becoming locked at the brake holder. The locking engagement by means of the fixing clamp is used to fix the brake pad guide spring safely on the brake holder, although it is easy to mount. For the additionally rattle-free brake pad guide, the brake pad guide spring includes at least one spring arm that fixes at least one brake pad under spring load relative to the brake holder in a clearance-free manner.

A favorable embodiment of the brake holder with brake pad guide spring is achieved in that the fixing clamp is locked at a correspondingly configured radial undercut of the brake holder. Such an undercut is preferably designed within the guiding portion of the brake pads on the brake holder. This allows shaping the undercut while machining the guiding portion for the brake pads what is anyway necessary. In addition, it is expedient to provide axially effective fixing clamps. This allows fixing the locked brake pad guide spring at the brake holder both in radial and axial directions. To further improve the attachment of the brake pad guide spring it can be suitable to make the locking engagement non-detachable so that the brake pad guide spring, after its locking engagement, cannot be removed from the brake holder without being destroyed. An alternative attachment of the brake pad guide spring is carried out by way of an appropriate projection on the brake holder at which the fixing clamp is locked, or which the fixing clamp embraces. Depending on the case of application, this arrangement allows attaching the brake pad guide spring by means of one single fixing clamp in axial and radial directions.

In a preferred variant of the brake holder with a brake pad guide spring, the brake pad guide spring includes a first portion for radial locking engagement of the brake pad at the spring arm, said portion forming a radial stop for the mounted brake pad. After the radial mounting of the brake pad in the brake holder with brake pad guide spring, the brake pad is thus prevented from lifting radially out of the guiding portion of the brake holder.

To facilitate the design of a rattle-free overall arrangement of the floating-caliper disc brake, it can be provided that the brake pad guide spring locked at the brake holder abuts in a clearance-free manner at least on guiding surfaces of the brake holder that are used for the displaceable arrangement of the brake pads on the brake holder.

Another advantageous variant of a brake pad guide spring is achieved in that a mounting ramp is provided at the spring arm for facilitating radial mounting of the brake pads. This simplifies the radial introduction of the brake pads into the brake holder, thereby preventing the brake pads from jamming in the brake holder.

In a suitable development of the brake holder with brake pad guide spring, the spring arm bears under preload against an inclined abutment surface of the brake pad, when the brake pad is mounted, and thus clamps the brake pad with respect to the brake holder in a clearance-free manner. This allows reliably preventing the undesirable development of rattle noises. It proves favorable in this context to provide a tangentially active stop for the spring arm subsequent to the inclined abutment surface on the brake pad. Said stop is used as a tangential abutment for the spring arm. Thus, the action of the spring arm allows the brake pad to be clamped in a rattle-free manner with respect to the brake holder both in radial and tangential directions.

In another favorable embodiment of the brake holder with brake pad guide spring, the first portion of the spring arm, which abuts on the brake pad in the mounted condition, is configured as a slope with respect to the axial direction. In particular, the preloading force of the spring arm is variable in dependence on the axial position of the brake pad at the slope, with the brake pad mounted.

The preloading force of the spring arm with slope thus varies in dependence on the displacement travel of the brake pad in the brake holder. Hence, a force component directed axially to the brake pad results by means of the slope. Said force component can be used for the clearance adjustment between the brake pad and an associated brake disc.

BRIEF DESCRIPTION OF THE DRAWINGS

FIGS. 1a-1c show three views of a brake holder with a brake pad guide spring for the brake pads in a first embodiment.

DETAILED DESCRIPTION OF THE PREFERRED EMBODIMENTS

Figure 2A:
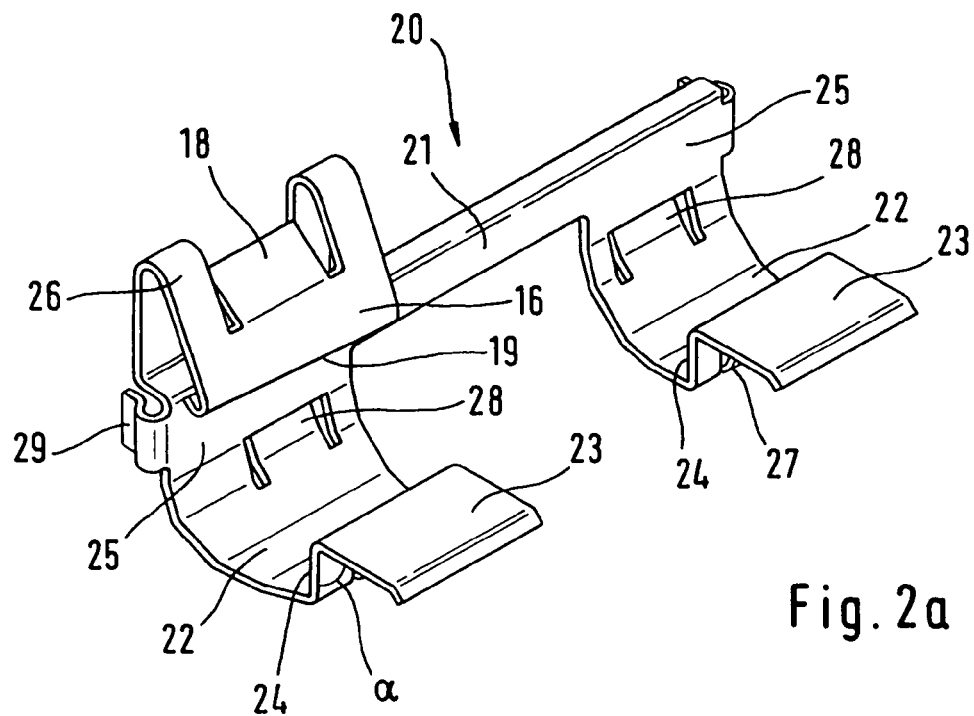
FIGS. 2a-2b show two views of the brake pad guide spring of FIG. 1.

The brake holder 1 shown in the Figures is a component part of a floating-caliper disc brake frequently used in motor vehicles. Brake holder 1 is fixed to the vehicle, for example, by way of threaded bores or through-bores 2. On the other hand, it is also feasible to integrate the brake holder 1 into a component fixed to the vehicle such as the steering knuckle. The brake holder 1 is used for the slidable support of a floating caliper (not shown), on the one hand, and for an axially 3 slidable accommodation of the brake pads 6, on the other hand, said brake pads being arranged on either side of the associated brake disc. In this arrangement, the floating caliper straddles the brake disc and the brake pads 6.

To accommodate the brake pads 6, the brake holder 1 comprises holder arms 7 straddling axially 3 the radially outwards edge of the brake disc (not shown). In this respect the designations of directions used in the description of the Figures, e.g. axial 3, tangential 4, and radial 5, refer to the axis of rotation of the brake disc. Several guiding surfaces 8 to 10 allowing a displaceable guide of the brake pads 6 are designed at the holder arms 7. To this end, lateral guiding portions 11 of the brake pads 6 engage, mainly in a form-fit manner, into the guiding recess 12 in the holder arms 7, said recess being formed of the guiding surfaces 8 to 10. Thus, the abutment of the guiding portions 11 on the guiding surfaces 8 to 10 allows transmitting circumferential brake forces that develop into the brake holder 1. The design of the L-shaped guiding portions 11 on the brake pad 6 and of the associated guiding surfaces 8 to 10 further allows a uniform support of the circumferential brake forces on the two holder arms 7.

Figure 2B:
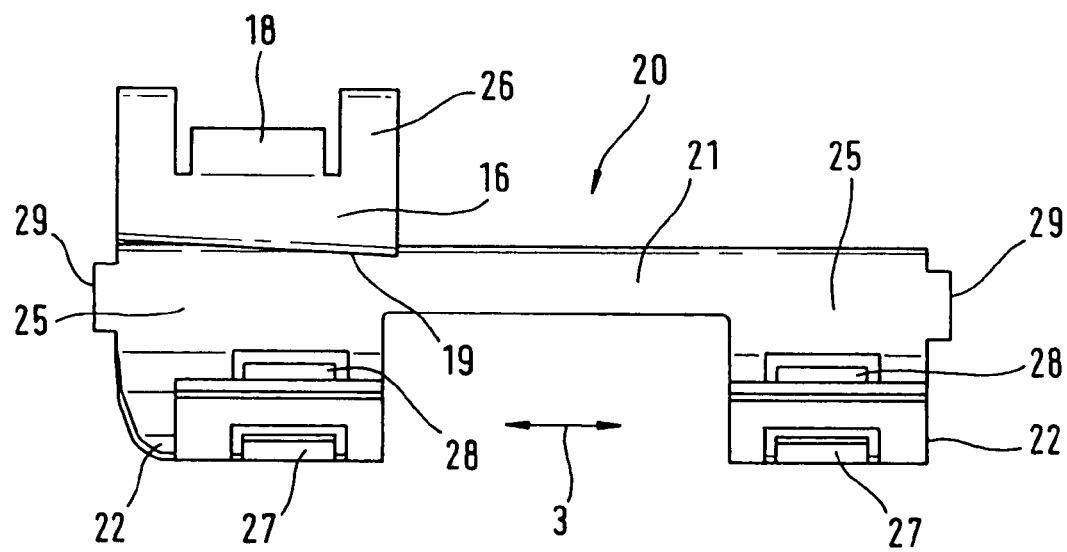

To enhance the ease of motion of the brake pad guide within the holder arms 7, there is provision of a brake pad guide spring 20, which extends between the brake holder 1 or the guiding surfaces 8 to 10, respectively, and the brake pad 6 in a first embodiment according to FIGS. 1 to 2. A brake pad guide spring 20 of this type prevents the direct contact between brake pad 6 and brake holder 1 and facilitates the displaceability of the brake pad 6 by corresponding surface conditions of the brake pad guide spring 20. To this end, the brake pad guide spring 20 is preferably made of a sheet-metal blank, e.g. of spring steel, or any other material exhibiting good sliding properties at least on its surface. In addition, the brake pad guide spring 20 has a resilient effect towards the brake pad 6 so that the brake pad 6 is retained on the brake holder 1 in a rattle-free manner.

The brake pad guide spring 20 comprises a base portion 21, which, on both sides thereof, passes over into a guiding portion 22, and also comprises a spring arm 26. The guiding portion 22 is provided with contact surfaces 23 to 25 for the abutment of the associated brake pad 6, said contact surfaces ensuring an easily movable displacement of the brake pad 6 with respect to the brake holder 1. Spring arm 26 serves for the radial locking engagement of the brake pad 6 on the brake holder 1 and additionally brings about rattle-free clamping of the brake pad in relation to the brake holder 1. To this end, the brake pad guide spring 20 is held captive on the holder arm 7. This attachment is carried out by means of at least one fixing clamp 27, 28, 29 locking the brake pad guide spring 20 on the brake holder 1. According to the first embodiment of the brake pad guide spring 20 according to FIGS. 1 to 2, the radially 5 active fixing clamps 27, 28 in each case engage into an undercut 13, 14 on the holder arm 7 or within the guiding recess 12. The fixing clamps 27, 28 themselves are deflected from the guiding portion 22 by simple machining. Thus, the configuration of the fixing clamps 27, 28 and the associated undercuts 13, 14 allows a particularly favorable mounting of the brake pad guide spring 20 on the brake holder 1. As this occurs, the brake pad guide spring 20 is shifted radially 5 into the guiding recess 12 on the holder arm 7 until the fixing clamps 27, 28 catch the undercuts 13, 14. The fixing clamps 27, 28 consequently fix the brake pad guide spring 20 radially in the holder arm 7, and the guiding portion 22 abuts on the guiding recess 12 in a clearance-free manner at least in the area of the guiding surfaces 8 to 10. The guiding surfaces 8 to 10 or the contact surfaces 23 to 25, respectively, are used for the abutment or support of the brake pads 6. The clearance-free abutment of the brake pad guide spring 20 is achieved, among others, because the angle α enclosed between the contact surfaces 23, 24 at the brake pad guide spring 20 is dimensioned insignificantly smaller than the angle β enclosed between the guiding surfaces 8, 9 at the holder arm 7. Hence, the result is the clearance-free abutment when the brake pad guide spring 20 is locked. As a whole, the locked fixing clamps 27, 28 provide such a rigid connection that it is impossible to dismount the brake pad guide spring 20 from the brake holder 1 without destroying it. The other fixing clamps 29 embrace the holder arm 7 axially 3 on both sides and thereby bring about an axially defined positioning of the brake pad guide spring 20 on the holder arm 7.

For the radially active locking engagement of at least one brake pad 6, a spring arm 26 is additionally designed at the brake pad guide spring 20 and, by abutting on the brake pad 6, simultaneously clamps the brake pad with respect to the brake holder 1. According to FIGS. 1 to 2, only one single spring arm 26 is provided at the brake pad guide spring 20, acting only on one of the brake pads 6. Of course, designs of the brake pad guide spring 20 with two arms 26 that act on both brake pads 6 are possible as well. More specifically, a first portion 16 is provided at the spring arm 26 for the radial locking engagement of the brake pad 6, said first portion providing a radial stop 16 for the brake pad 6. Said radial stop 16 is preferably configured in the form of an angled-off or rounded edge of the spring arm end portion. However, the spring arm 26 not only causes radial locking engagement of the brake pad 6 on the brake holder 1 but also the pad's rattle-free clamping with respect to the brake holder 1. To this end, the first portion 16 of spring arm 26 bears under spring load against an inclined abutment surface 17, on the one hand, and against a tangentially 4 active stop 41 on the brake pad 6, on the other hand. A spring force component both in radial 5 and tangential 4 directions is achieved for the brake pad by the abutment of the spring arm 26. Said spring bias ensures a rattle-free arrangement of the brake pad 6 in radial and tangential directions.

The essentially V-shaped configuration of the spring arm 26 further brings about an easy mountability of the brake pad 6. In this arrangement, the brake pad 6 is shifted during the brake pad assembly from radially outwards into the brake pad guide spring 20 locked in the holder arm 7 until the spring arm 26, with its first portion 16, will move into abutment on the inclined abutment surface 17 or on the tangential stop 16, respectively. Further, mounting of the brake pad 6 is additionally simplified by the provision of a mounting ramp 18 on the spring arm 26. Said mounting ramp 18 facilitates the radial insertion of the brake pad 6 and prevents it from being jammed.

Another spring force component that acts on the brake pad 6 is realized by designing a slope 19 at the first portion 16 of the spring arm 26. Said slope 19 forms an angle relative to the axial direction 3 and abuts on the brake pad 6 when readily mounted. In dependence on the axial position of the brake pad 6 within the guiding portion 22, consequently, there is a variable force effect by means of the spring arm 26 on the brake pad 6. This leads to an axially 3 directed spring force component tending to urge the brake pad 6 away from the brake disc (not shown) when the disc brake is ready for work. Thus, the slope 19 can be used during braking operation for the better adjustment of the clearance between brake pad 6 and brake disc. As another alternative for realizing an axial spring force component by means of the slope 19, the spring arm 26 can e.g. also be designed asymmetrically with respect to a plane normal to the axial direction 3.

Figure 3A:
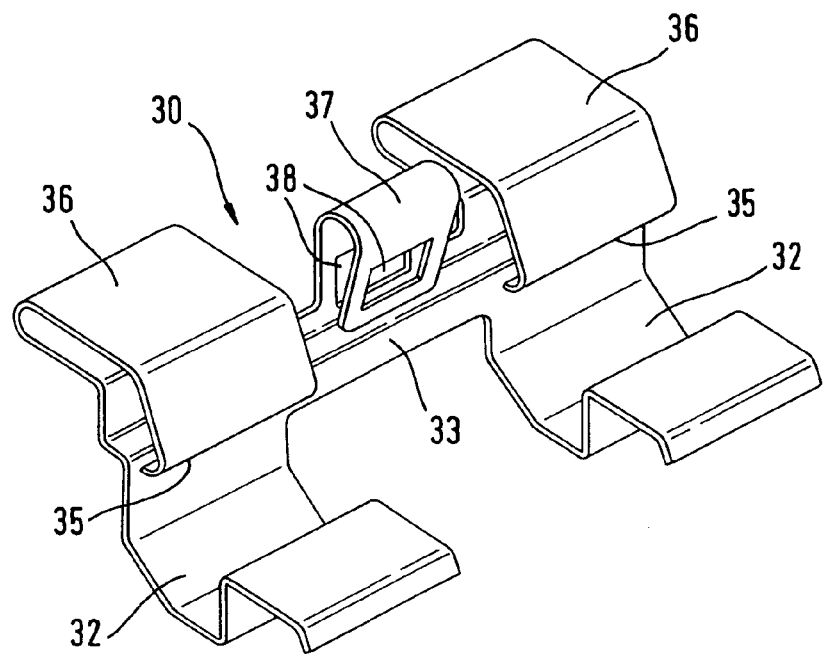
FIGS. 3a-3b show two views of a brake holder and an associated brake pad guide spring in a second embodiment.
Figure 3B:
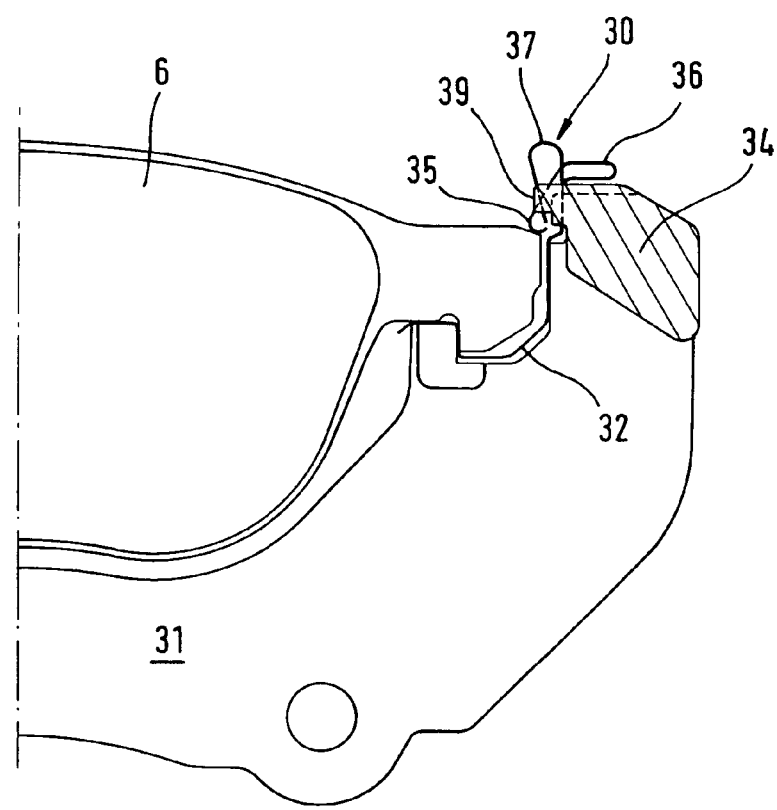

FIG. 3a-b shows in two views a brake holder 31 with an associated brake pad guide spring 30 in an alternative embodiment. As described already, the brake pad guide spring 30 includes a base portion 33 interconnecting two guiding portions 32 for the brake pad accommodation. In their readily mounted condition, said guiding portions 32 in turn are arranged in the guiding recesses 12 of the holder arm 34. In contrast to the previously explained embodiment, the brake pad guide spring 30 according to FIG. 3a-b includes two spring arms 36 which abut under bias on an associated brake pad 6 in each case by way of a first portion 35 in the form of a radial stop. Thus, both brake pads 6 can be radially locked and clamped in a rattle-free manner according to this design variant of the brake pad guide spring 30. Further, the two spring arms 36 have a different geometrical shape compared to the first embodiment of the brake pad guide spring. In particular, the spring arms 36 have a longer and highly curved design. In general, the defined rating of the spring arm 36 permits adjusting the desired spring bias force that acts on the brake pad 6 within defined tolerances. Thus, the design of the spring arm allows purposefully adjusting the spring's biasing force depending on the case of application. Different configurations of the spring arm are hence feasible under the invention. Only one single fixing clamp 37 is provided for the easy-to-mount attachment of the brake pad guide spring 30 on the brake holder 31. Said fixing clamp 37 has at least one opening 38 which, with the brake pad guide spring 30 locked, encloses a correspondingly designed projection 39 at the holder arm 34 in a substantially form-fit manner. Due to this arrangement the brake pad guide spring 30 is fixed on the holder arm 34 in a radial and axial fashion and, nevertheless, can be mounted radially in a very easy manner.

Figure 4A:
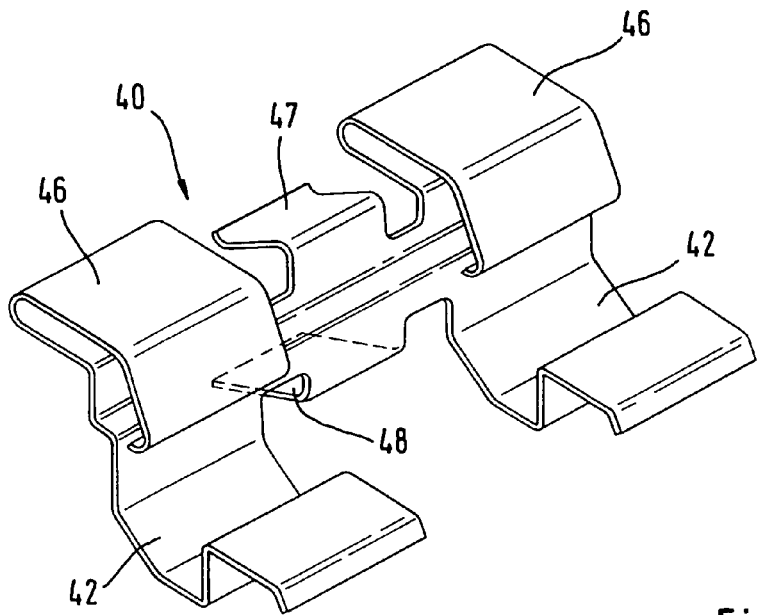
FIGS. 4a-4b show two views of a brake holder and an associated brake pad guide spring in a third embodiment.
Figure 4B:
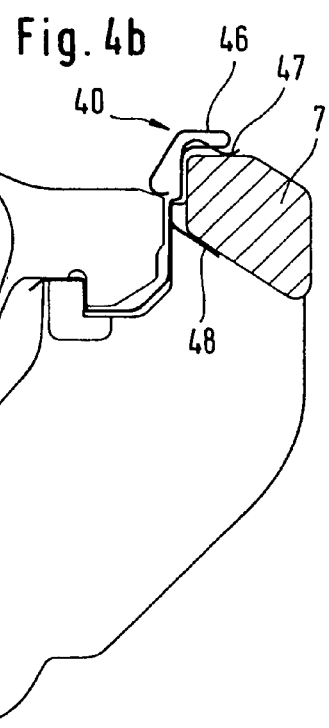

Another alternative construction of a brake pad guide spring 40 can be taken from two views referring to FIG. 4a-b. The brake pad guide spring 40 includes for each of the associated brake pads 6 a corresponding guiding portion 42 and a spring arm 46. Two fixing clamps 47, 48 embracing the holder arm 7 are provided to fasten the brake pad guide spring 40 on the brake holder 1 or the holder arm 7, respectively. More specifically, the fixing clamps 47, 48 abut under preload on the holder arm 7 in the area of the disc's passage at the holder, that means in a portion of the holder arm 7 projecting above the brake disc directly radially outside or extending between the guiding recesses 12 at the holder arm. Thus, the two fixing clamps 47, 48 ensure both radial and axial fixation of the brake pad guide spring 40 on the holder arm 7. Further, the use of fixing clamps 47, 48 of this type obviates the need for an additional machining of the holder arm 7 for the purpose of attachment of the brake pad guide spring 40.

Figure 5:
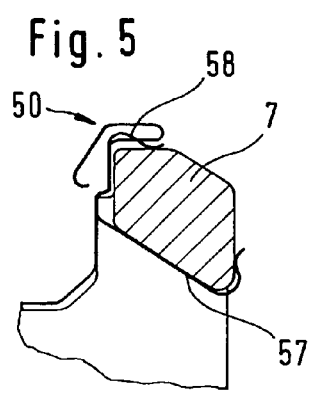
FIG. 5 is a partial view of a brake holder with an associated brake pad guide spring in a fourth embodiment.
Figure 6:
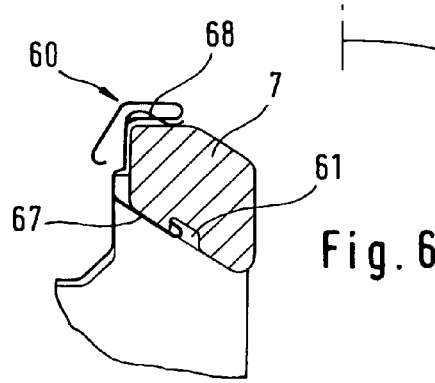
FIG. 6 is a partial view of a brake holder with an associated brake pad guide spring in a fourth embodiment.

FIGS. 5 to 6 show two further variants for the attachment of a brake pad guide spring 50, 60 of the invention on a corresponding holder arm 7. Two fixing clamps 57, 58 or 67, 68, respectively, are provided by means of which the brake pad guide spring 50, 60 is locked at the holder arm 7. Thus, the fixing clamps 57, 58 or 67, 68, respectively, ensure in each case radial and axial fixation of the brake pad guide spring 50, 60 on the holder arm 7. According to FIG. 5 the fixing clamp 57 embraces the holder arm 7 in an arcuate fashion in the area of the disc's passage at the holder so that the fixing clamp 57 encloses the holder arm 7 over almost half its periphery. This provides a very good grip of the brake pad guide spring 50 on the holder arm 7, without additional mechanical treatment of the holder arm 7.

The variant of the brake pad guide spring 60 according to FIG. 6 achieves the non-detachable attachment on the holder arm 7 because the fixing clamp 67 with its end portion is engaged in an associated pocket 61 of the holder arm 7 in a generally form-fit manner. This allows also a precise positioning and reliable fixation on the holder arm 7.

The invention claimed is:

1. A brake pad assembly comprising a brake pad and a guide spring for engagement with the brake pad, the brake pad including a main portion and a lateral guiding portion extending from the main portion, the lateral guiding portion including a stop surface located on a first side of the lateral guiding portion and a radial extension located on a second side of the lateral guiding portion, the second side being radially opposite the first side, the guide spring comprising an end portion for engagement with the stop surface, the end portion comprising an axial spring force component with a sloped edge that is sloped in the axial and the radial direction such that the slope edge has a first end and a second end radially offset from the first end, the guide spring further comprising a guiding channel having a depth for receiving the radial extension.

2. The brake pad assembly of claim 1, wherein the guide spring comprises a cantilevered spring arm that terminates tangentially inwardly over the guiding channel.

3. The brake pad assembly of claim 2, wherein the spring arm comprises a pair of V-shaped hinge portions separated by an opening and a central ramp portion extending between the V-shaped hinge portions, the central ramp portion forming a sliding surface that bends radially toward the guiding channel to allow the lateral guiding portion to slide radially over the ramped surface and into the guiding channel.

4. The brake pad assembly of claim 1, wherein the end portion of the guide spring comprises a contoured edge for engagement with the stop surface.

5. The brake pad assembly of claim 4, wherein the contoured edge comprises a convex edge.

6. The brake pad assembly of claim 4, wherein the contoured edge comprises an angled-off edge.

7. The brake pad assembly of claim 1, wherein the guide spring comprises an elongated base having a first end and a second end, and wherein the guiding channel comprises a first guiding channel section extending from the first end of the base for receiving the brake pad, and a second guiding channel section on the second end of the base, the second guide channel section being separated from the first guiding channel section by an opening.

8. The brake pad assembly of claim 7, wherein the spring arm extends over the first guiding channel section but not the second guide channel section.

9. The brake pad assembly of claim 1 further comprising a contact surface adjacent the guiding channel, wherein a section of the contact surface is partially cut to form a flexible fixing clamp.

10. A brake pad assembly comprising a brake pad and a guide spring for engagement with the brake pad, the brake pad including a main portion and a lateral guiding portion extending from the main portion, the lateral guiding portion including a stop surface and a radial extension having three sides, the stop surface located on a first side of the lateral guiding portion and the radial extension located on a second side of the lateral guiding portion, the second side being radially opposite the first side, the guide spring comprising an end portion having an axial spring force component with a sloped edge that is sloped in the axial and the radial direction such that the sloped edge has a first end and a second end radially offset from the first end, and the guide spring comprising a guiding channel having a depth for receiving the radial extension and surrounding the three sides of the radial extension.

11. The brake pad assembly of claim 10, wherein the guide spring comprises a cantilevered spring arm that terminates tangentially inwardly over the guiding channel.

12. The brake pad assembly of claim 11, wherein the spring arm comprises a pair of V-shaped hinge portions separated by an opening and a ramp potion extending between the V-shaped hinge portions.

13. The brake pad assembly of claim 10, wherein the lateral guiding portion comprises the stop surface, and the guide spring comprises a contoured edge for engagement with the stop surface.

* * * * *